L. A. McNEIL.
MACHINE FOR MAKING FLOWER-POTS.
No. 172,820. Patented Feb. 1, 1876.
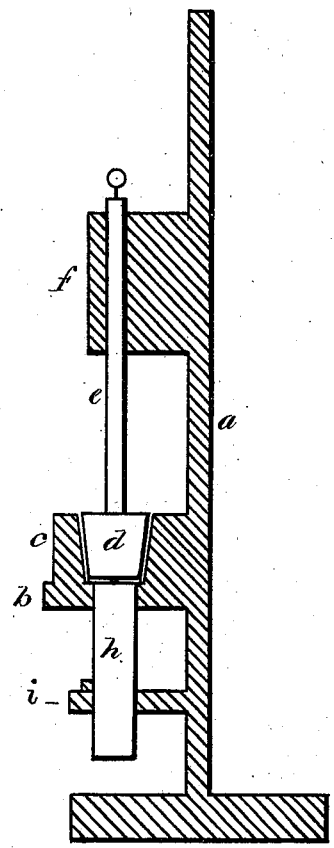
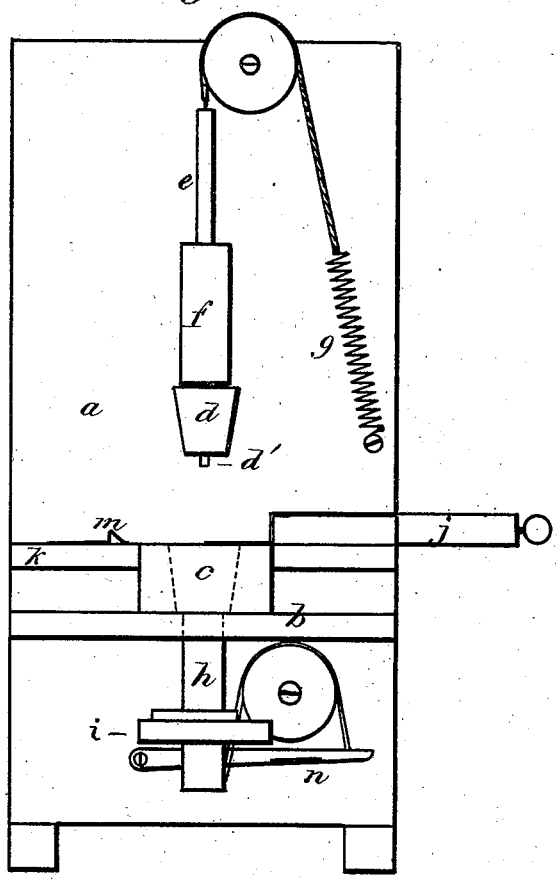
Witnesses.
Inventor.
Leonard A. McNeil

UNITED STATES PATENT OFFICE.

LEONARD A. McNEIL, OF ELMWOOD, CONNECTICUT, ASSIGNOR TO HIMSELF AND WILBER E. GOODWIN.

IMPROVEMENT IN MACHINES FOR MAKING FLOWER-POTS.

Specification forming part of Letters Patent No. 172,820, dated February 1, 1876; application filed June 28, 1875.

*To all whom it may concern:*

Be it known that I, LEONARD A. MCNEIL, of Elmwood, county of Hartford and State of Connecticut, have invented a certain new and useful Improvement in Machines for Manufacturing Flower-Pots; and to enable others skilled in the art to make the same, I will proceed to describe the same, referring to the drawing, in which the same letters indicate like parts in each of the figures.

This improvement consists in constructing mechanism for making flower-pots, operated automatically or by manual effort, of various sizes and shapes.

In the accompanying drawing, Figure 1 is a front elevation. Fig. 2 is a vertical center elevation.

$a$ represents the wall or frame-work to which the mechanism is secured. $b$ is the bench upon which the mold works, or in or to which it is secured. $c$ is the mold in which is placed the material used in making the flower-pot. $d$ is a die or former for compressing said material in the mold into the desired shape or pattern, and provided with a stop, $d'$, to secure a sufficient space to form the thickness of the bottom of a flower-pot, both of which—the mold and the die or former—are designed, in practice, to be made of glass, metal, or wood.

The die is secured to a shaft, $e$, which plays freely in the stock $f$, and is depressed and elevated into and out of the mold by means of crank-pin, lever, weight, or spring $g$.

The upper end of the shaft $h$ forms the bottom of the mold $c$, and is fitted to work up and down through the bench $b$ and bracket $i$, so that, after the pot is formed, the elevation of the ejecting-plunger $h$ by crank-pin, lever, or foot-treadle $n$, it will lift the pot the proper height with the upper end of the mold to allow the shovel $j$ to slide under the pot, and move it forward from over the mold upon a carrier or table, $k$, and is held from moving back with the shovel by a rising stop or spring, $m$.

Thus it will be seen that by the use of motive power or manual effort the clay or other material may be placed in the mold and compressed into shape, elevated out of the mold by the shaft $h$, removed by the reciprocating shovel $j$ upon, and held by spring $m$ upon, the carrier or table $k$.

By these means, and in this manner, I am able to produce in the most rapid manner well-formed and perfectly-compressed flower-pots. I do not claim that my machine is, in all its details, new, and my invention, for I am aware that molds and dies, and suitable operative mechanism, have long been used for a like purpose; but I am not aware that any one has before been made in the manner and so as to operate as above described.

What I claim, and desire to secure by Letters Patent, is—

In a machine for making flower-pots, substantially as herein described, the molds $c$, compressing-die $d$, shaft $h$, carrier or spring $k$, rising stop or spring $m$, and reciprocating shovel $j$, all combined and operating substantially as set forth.

LEONARD A. McNEIL.

Witnesses:
N. C. WILDER,
JEREMY W. BLISS.